3,190,947
PROCESS FOR REPRODUCING A PATTERNED SURFACE IN MICROSCOPIC DETAIL
Kenneth Norcross, Morecambe, England, assignor to Nairn-Williamson Limited, a British company
Filed Dec. 21, 1961, Ser. No. 161,029
Claims priority, application Great Britain, Dec. 30, 1960, 44,800/60
6 Claims. (Cl. 264—216)

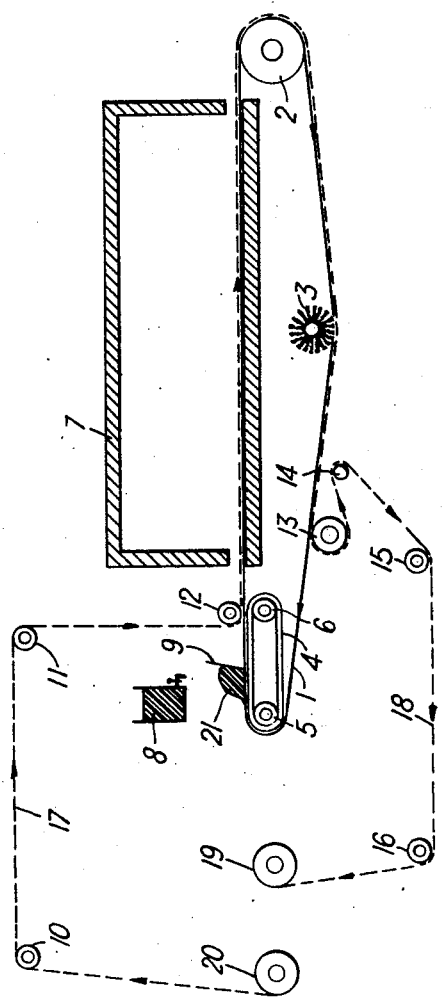

In the manufacture of polyvinyl chloride in sheet form, usually on a textile backing, there is no great difficulty in producing a bold pattern in relief on the sheet. This can be done by means of an embossing roller or plate engraved with a negative of the pattern. As the pattern becomes finer, however, it becomes increasingly difficult to reproduce it exactly in the polyvinyl chloride, largely because the steel roller cannot easily be engraved with a very fine pattern. An example of such a fine pattern is natural suede, and although this can be imitated in polyvinyl chloride the imitation has hitherto always been poor. It is well-known to produce imitation textiles with a relatively coarse weave by the embossing-roller technique, but these imitations also are not very good when inspected closely.

According to this invention a fine pattern is produced in polyvinyl chloride by feeding an ungelled polyvinyl chloride composition onto an endless belt of a silicone elastomer bearing a negative of the pattern, running the belt with the compositon on it through a heating chamber to cause the polyvinyl chloride to emerge as a gelled layer on the belt, cooling the layer while it is still on the belt and then stripping it from the belt.

It has been found that a fine pattern can be reproduced in the polyvinyl chloride with remarkable accuracy of detail by means of the invention. It is possible to produce very good imitations of suede and also of textiles, in which one can see not only warp and weft threads quite clearly but also individual fibres in the threads, for example fibres that are about 20μ in diameter. In fact it is possible by means of the invention to produce on a sheet of polyvinyl chloride accurate reproductions of a large number of patterns normally associated with other materials, e.g. leather, textiles and wood.

The composition, which is of a paste-like or creamy consistency, is preferably a polyvinyl chloride plastisol consisting of particles of polyvinyl chloride suspended in a plasticiser, which may be, for instance, dioctyl phthalate, a mixture of dialkyl phthalates in which the alkyl groups may have from 7 to 9 carbon atoms, or trixylenyl phosphate. In order that the composition may be readily applied to the belt, the polyvinyl chloride should be of a grade which is not readily swollen by the plasticiser at room temperature. One very suitable composition consists (by weight) of 60% polyvinyl chloride and 40% plasticiser. Copolymers of vinyl chloride with vinyl acetate or vinylidene chloride in which vinyl chloride is the major constituent may replace part of the polyvinyl chloride in the composition. The composiiton must in any case be capable of being spread over the surface of the belt, contain polyvinyl chloride as a substantial constituent and be capable of gelling to a uniform film or sheet under the influence of heat.

The composition may also contain further conventional ingredients. In particular it will generally contain a heat-stabiliser; many heat-stabilisers for polyvinyl chloride are known, and calcium stearate, cadmium and barium laurates, and tin stabilisers are only a few examples. The composition will commonly also contain a pigment.

The heating chamber may simply be a hot-air chamber in which the temperature is sufficiently high to cause a uniform coating of polyvinyl chloride to gel. In the case of polyvinyl chloride suspended in a plasticiser this temperature may be as low as 160° C. or as high as 200° C., but it is preferably maintained at from 170 to 180° C. There may be a temperature gradient in the heating chamber, and in part of it the temperature may be less than 160° C., but it is important that the polyvinyl chloride should reach this temperature, at least for a short time.

The residence time of the polyvinyl chloride in the chamber depends on the temperature, and may be reduced as the temperature in the heating chamber is increased. It may be, for example, 3 minutes at a temperature of 160–180° C.

Preferably a backing sheet, e.g. a cotton fabric, is applied to the polyvinyl chloride layer before this enters the heating chamber, so that the layer will gel in contact with and adhere to the backing, and then the product is of the kind called leathercloth. The backing sheet may advantageously be of any desired flexible material that is coated if necessary to enable the polyvinyl chloride to adhere to it.

In the absence of the backing, the product will be a film or sheet or polyvinyl chloride alone.

It is desirable that the composition should be applied to the endless belt in a thin layer. If a thick or heavy product is required, a backing of plain smooth polyvinyl chloride leathercloth may be used with advantage.

The endless belt is an important element of the invention, since the fineness of the reproduced pattern depends on it. The silicone elastomer used must be sufficiently liquid in its uncured state to fill the surface depressions and interstices of the fine pattern and must be capable, when mixed with a catalyst, of curing to a heat-stable solid state. A liquid polysiloxane may be used and it is particularly convenient that this should be cold-curing. Numerous proposals have been made as to how such a polysiloaxne may be cured with a cross-linking agent and a catalyst. The polysiloxane, which should contain reactive functional groups for cross-linking purposes, may for example be principally dimethyl-polysiloxane. The cross-linking agent may be an organo-silicate, while a large number of catalysts have been proposed for accelerating the vulcanisation of polysiloxanes. Such catalysts include carboxylic acid salts of a wide variety of metals, and also organo-metal compounds, such as dibutyl-tin-dilaurate. Examples of the production of these elastomers are to be found in British patent specifications Nos. 841,825 and 844,128, and in United States Patent No. 2,983,694. For the purposes of this invention the elastomer may advantageously be produced from a liquid polysiloxane rubber that is vulcanisable at room temperature by an organo-tin compound and a silicate. Such rubbers are available on the market under the trademarks Silastomer 9160 and 9161. A mixture of equal quantities of these two rubbers has a particularly suitable viscosity. Other commercially available rubbers are those sold under the trade names Silcoset 100, 101, 102 and 103. Of these it is preferred to use either Silcoset 101 or Silcoset 103.

The silicone elastomer of the belt is preferably carried by a flexible backing, which may, for example, be of cotton or for greater heat-resistance and useful life may be of glass or metal in flexible sheet or mesh form.

Glass, metal or other backing which will not readily adhere to a silicone should be suitably primed to promote adhesion. If a glass fabric is used this should be cleaned, for example by exposing it to a flame to burn off any foreign matter on its surface. It is convenient to pre-coat the backing with the silicone on both sides, allow these preliminary coatings to cure, and then apply this coated backing to the coating of silicone on the pattern. We find that a belt with a precoated backing has a reduced tendency to curl, and, in addition, should any of the polyvinyl chloride composition find its way onto the backing it is much more readily removed than from a belt in which a surface of the backing is exposed.

In making the belt it is preferred to take a pattern of a length equal to the belt, coat this pattern with the silicone to which the catalyst has been added, apply a length of fabric over the silicone and wind the assembly into a tight roll. When the silicone has set solid, the whole roll may be immersed in acetone or other swelling agent to facilitate the stripping of the silicone from the pattern. The fabric remains adherent to the silicone as a backing for the belt.

As an example of the production of a silicone belt bearing a negative of the desired pattern, a length of imitation suede fabric equal to the length of the belt was coated with Silcoset 101, to which the catalyst supplied had been added. A length of cotton fabric, previously coated on both sides with Silcoset 101 which was allowed to cure, was then applied over the silicone, the assembly was wound into a tight roll, and the silicone was allowed to cure. Then the roll was immersed in acetone for 6 hours and the suede fabric was finally stripped from the silicone, which was then formed into the endless belt.

A suitable apparatus for producing a fabric-backed product in accordance with the invention will now be described by way of illustration with reference to the accompanying diagrammatic drawing.

The apparatus includes an endless silicone belt 1 which is in contact with a water-cooled roller 2, a rotary brush 3, and a thick endless rubber belt 4 stretched between a pair of rollers 5 and 6. A hot-air chamber 7 encloses part of the upper run of the silicone belt 1. The apparatus also includes a reservoir 8, a doctor blade 9, and a series of rollers 10 to 16. Plain polyvinyl chloride backing 17 is supplied from a roll 20, and the patterned product 18 is wound onto a roll 19.

For the production of imitation suede, the following composition was placed in the reservoir 8:

| | Parts by weight |
|---|---|
| Geon 121 (Paste-forming polyvinyl chloride powder. "Geon" is a registered trademark) | 60 |
| Dioctyl phthalate | 40 |
| Brown pigment | 5 |
| Calcium stearate (heat stabiliser) | 2 |

This composition was allowed to run onto the silicone belt 1 to form a bank 21 in front of the doctor blade 9. The silicone belt was driven in the direction shown by the rollers 2 and 5, and was coated thinly with the ungelled polyvinyl chloride composition to give a coating weighing about 135 grams per square metre. At the same time a plain-surfaced polyvinyl chloride backing 17 was drawn from the roll 20 over the rollers 10 and 11, and was brought into contact with the coated silicone belt between the rollers 12 and 6. The polyvinyl chloride surface of the backing 17 was in effect bonded here to the ungelled film of the composition. This assembly then passed into the hot-air chamber 7, which was maintained at a temperature of 170–180° C., for about 3 minutes. In the chamber the film of ungelled composition was converted into uniformly gelled film, and became united with the backing 17. The assembly was cooled as it passed over the water-cooled roller 2, the reverse side of the belt 1 being brushed by the rotary brush 3 to remove any dirt, and the patterned positive product 18 bearing the fine suede-like pattern on its surface was stripped from the belt 1 by the roller 13, which was somewhat over-driven. After passing over the rollers 14, 15 and 16 the product 18 was wound onto the roll 19.

I claim:

1. A process for forming a negative casting surface of a fine pattern in relief for casting a positive composed of a resin composition, comprising coating said fine pattern with a cold-curing liquid silicone resin, tightly winding said pattern with the uncured silicone resin thereon on a roll, curing said coating while maintaining it on said fine pattern on said roll, soaking said cured coating in a swelling agent, and then stripping the resulting cured silicone resin coating from said pattern to expose in said coating a negative of the surface of said pattern.

2. A process for reproducing a patterned surface in microscopic detail comprising:
   (a) casting a liquid silicone resin upon the surface to be reproduced, curing said silicone resin on said surface, and then stripping said resin from said surface thereby forming a negative of said surface; and then
   (b) casting an ungelled vinyl resin on said negative, curing said vinyl resin on said negative to form a film, and then stripping said film from said negative to obtain a positive reproduction in microscopic detail of said patterned surface.

3. A process as in claim 2, said silicone resin comprising a cold curing polysiloxane resin mixed with a cross-linking agent and a catalyst.

4. A process as in claim 3, further comprising applying a backing to said silicone resin negative.

5. A process as in claim 4 in which said patterned surface has a texture composed of fine fibers some of which have a diameter of about twenty microns.

6. A process as in claim 4 in which said patterned surface is suede.

References Cited by the Examiner

UNITED STATES PATENTS 2,327,627   8/43   Esselen _____ 264—216

FOREIGN PATENTS 540,530   10/41   Great Britain.
801,938   9/58   Great Britain.
828,977   2/60   Great Britain.

OTHER REFERENCES

Higgins: "Cast and Coated Films," reprint of paper delivered at December 1951 meeting of the Society of the Plastics Industry, John Waldron Corp., New Brunswick, N.J., pages 1–4 and 14 relied upon.

Schildknecht, C. E.: "Polymer Processes," Interscience Publishers, Inc., New York, 1956, pages 692–693.

ALEXANDER H. BRODMERKEL, *Primary Examiner.*

MICHAEL V. BRINDISI, *Examiner.*